United States Patent
McDaniel et al.

(10) Patent No.: US 9,363,378 B1
(45) Date of Patent: Jun. 7, 2016

(54) PROCESSING STORED VOICE MESSAGES TO IDENTIFY NON-SEMANTIC MESSAGE CHARACTERISTICS

(71) Applicant: Noble Systems Corporation, Atlanta, GA (US)

(72) Inventors: Patrick M. McDaniel, Atlanta, GA (US); Karl H. Koster, Sandy Springs, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 40 days.

(21) Appl. No.: 14/219,171

(22) Filed: Mar. 19, 2014

(51) Int. Cl.
*H04M 1/64* (2006.01)
*H04M 3/533* (2006.01)

(52) U.S. Cl.
CPC ..................... *H04M 3/533* (2013.01)

(58) Field of Classification Search
CPC .......... H04M 3/53333; H04M 3/5335; H04M 2203/4536; H04M 2203/4527
USPC .................................. 379/68, 88.13
See application file for complete search history.

(56) References Cited

U.S. PATENT DOCUMENTS

| | | | |
|---|---|---|---|
| 6,665,644 B1 | 12/2003 | Kanevsky et al. | |
| 7,340,393 B2 | 3/2008 | Mitsuyoshi | |
| 7,373,301 B2 | 5/2008 | Kemp et al. | |
| 7,669,135 B2 * | 2/2010 | Cunningham | G06F 3/0219 455/466 |
| 8,412,530 B2 | 4/2013 | Pereg et al. | |
| 8,594,285 B2 | 11/2013 | Conway et al. | |
| 8,600,755 B2 | 12/2013 | Cross, Jr. et al. | |
| 2009/0210220 A1 | 8/2009 | Mitsuyoshi et al. | |
| 2010/0158213 A1 * | 6/2010 | Mikan | H04M 3/42221 379/88.14 |
| 2013/0268273 A1 | 10/2013 | Chen et al. | |
| 2014/0140497 A1 | 5/2014 | Ripa et al. | |
| 2014/0236596 A1 * | 8/2014 | Martinez | G06F 17/2785 704/235 |

FOREIGN PATENT DOCUMENTS

| | | |
|---|---|---|
| EP | 1271469 | 1/2003 |
| EP | 1298645 | 4/2003 |

OTHER PUBLICATIONS

Mohamed Bencherif et al., Gender Effect in Trait Recognition, Proceedings of the World Congress on Engineering and Computer Science 2012 vol. 1, Oct. 24-26, 2012, San Francisco, US.

(Continued)

*Primary Examiner* — Van D Huynh

(57) ABSTRACT

Various methods, systems, and computer-program products are provided for indicating a message characteristic indicator ("MCI") in conjunction with a stored voice message. In various applications where voice messages may be received, a speech analytics system processes the voice message to ascertain a non-semantic speech-related characterization of the message. An indication of a corresponding MCI, such as an emoticon, is associated with the stored message, which can be used to display the corresponding MCI on a user interface. In one embodiment, the stored voice message is a voice mail message received in conjunction with a call to a wireless user. A voice mail storage system utilizes a speech analytics system to process the voice data and ascertain the non-semantic speech-related characterization of the message and a message is sent to the subscriber's mobile phone indicating the appropriate MCI to display in conjunction with the meta-data of the voice mail message.

11 Claims, 8 Drawing Sheets

(56) References Cited

OTHER PUBLICATIONS

Jonathan Low, In a Mood? Technology Helps Call Centers Identify It, retrieved from www.thelowdownblog.com/2013/10/in-mood-technology-helps-call-centers.html, posted Oct. 15, 2013.

Chastagnol, et al., Personality traits detection using a parallelized modified SFFS algorithm, retrieved from ftp://tlp.limsi.fr/public/is12_1243devil.pdf on Apr. 7, 2014.

Rita Sallam, et al., Cool Vendors in Contact Analytics, 2012, Gartner research note G00232131, retreived fromhttp://www.asknet.ru/Analytics/reports/Cool%20Vendors%20in%20Content%20Analytics,%202012.pdf on Apr. 7, 2014.

Micheal Feld, et al., Automatic Speaker Age and Gender Recognition in the Car for Tailoring Dialog and Mobile Services, Interspeech 2010, Sep. 26-30, Mahuhari, Chiba, Japan.

Alicia Grandey, et al., The Customer is Not Always Right: Customer Aggression and Emotion Regulation of Service Employees, Journal of Organizational Behavior, 25-1-22 (2004), www.interscience.wiley.com, Apr. 10, 2003.

Chengwei Huang, et al., Pratical Speech Emotion Recognition Based on Online Learning: From Acted Data to Elicited Data, Mathematical Problems in Engineering, vol. 2013, Article Id 265819, Mar. 7, 2013.

Ming Li, et al., Automatic Speaker Age and Gender Recognition Using Acoustic and Prosodic Level Information Fusion, Viterbi School of Engineering, University of Southern California, Los Angeles, CA 90089, Jan. 26, 2012.

Francois Mairesse, et al., Automatic Recognition of Personality in Conversation, retrieved from http://d1.acm.org/citation.cfm?id=1614071, 2006.

William Mayew, et al., Speech Analysis in Financial Markets, Foundation and Trends in Accounting vol. 7, No. 2 (2012) 73-130, Apr. 12, 2013.

Gelareh Mohammadi et al., Automatic Personality Perception: Prediction of Trait Attribution Based on Prosodic Features, retrieved from http://infoscience.epfl.ch/record/173420/files/submission.pdf on Apr. 7, 2014.

Tim Polzehl, et al., On Speaker-Independent Personality Perception and Prediction from Speech, retrieved from http://www.cs.cmu.edu/~fmetze/interACT/Publications_files/publications/is2012.pdf, published in 2012.

Elizabeth Berstein, A Tiny Pronoun Says a Lot About You, Wall Street Journal, Oct. 7, 2013.

* cited by examiner

PROCESSING STORED VOICE MESSAGES TO IDENTIFY NON-SEMANTIC MESSAGE CHARACTERISTICS

BACKGROUND

Various communication services allow storage and retrieval of voice messages, with perhaps the most common service being voice mail. Voice mail is frequently provided in conjunction with telephony oriented services, such as wireline or wireless (i.e., cellular) telephone services. The proliferation of smart phones has facilitated a user's interaction with voice mail service, such that the user can now easily review information about pending voice messages, such as who called and when. Typically, a graphical user interface is used on the smart phone to provide notification of pending voice messages as well as provide limited information about the messages themselves. Such information may be useful to the user in deciding which messages to retrieve first.

The limited information provided to a user about a voice mail message may include the origin and length of the voice message. However, typically users are not provided any information about the contents of the voice mail message until the user retrieves and reviews its contents. However, it would be helpful for the user to have some sort of succinct visual indication of certain aspects of the voice mail message prior to reviewing the voice mail message. Such information may be relevant as to when the user decides to review the information. Accordingly, it is with respect to this consideration and others that the disclosure herein is presented.

BRIEF SUMMARY

In general, embodiments of the present invention provide computer-program products, methods, systems, apparatus, and computing entities for processing stored voice messages so as to provide supplemental information regarding the sender or contents of a voice message. In one embodiment, the supplemental information provides an indication of a corresponding non-semantic message characteristic with the voice message. This indication may comprise an icon, such as an emoticon, indicated to the user in association with the voice message. In one embodiment, the stored voice message is a voice message associated with a text message sent to a wireless subscriber. In one embodiment, a smart phone processes the stored voice message to ascertain an appropriate non-semantic indicator that should be displayed on the subscriber's mobile smart phone in conjunction with reviewing messages.

As is discussed in greater detail below, the subject matter disclosed herein may be implemented as a computer-controlled apparatus, a method, a computing system, or an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1:
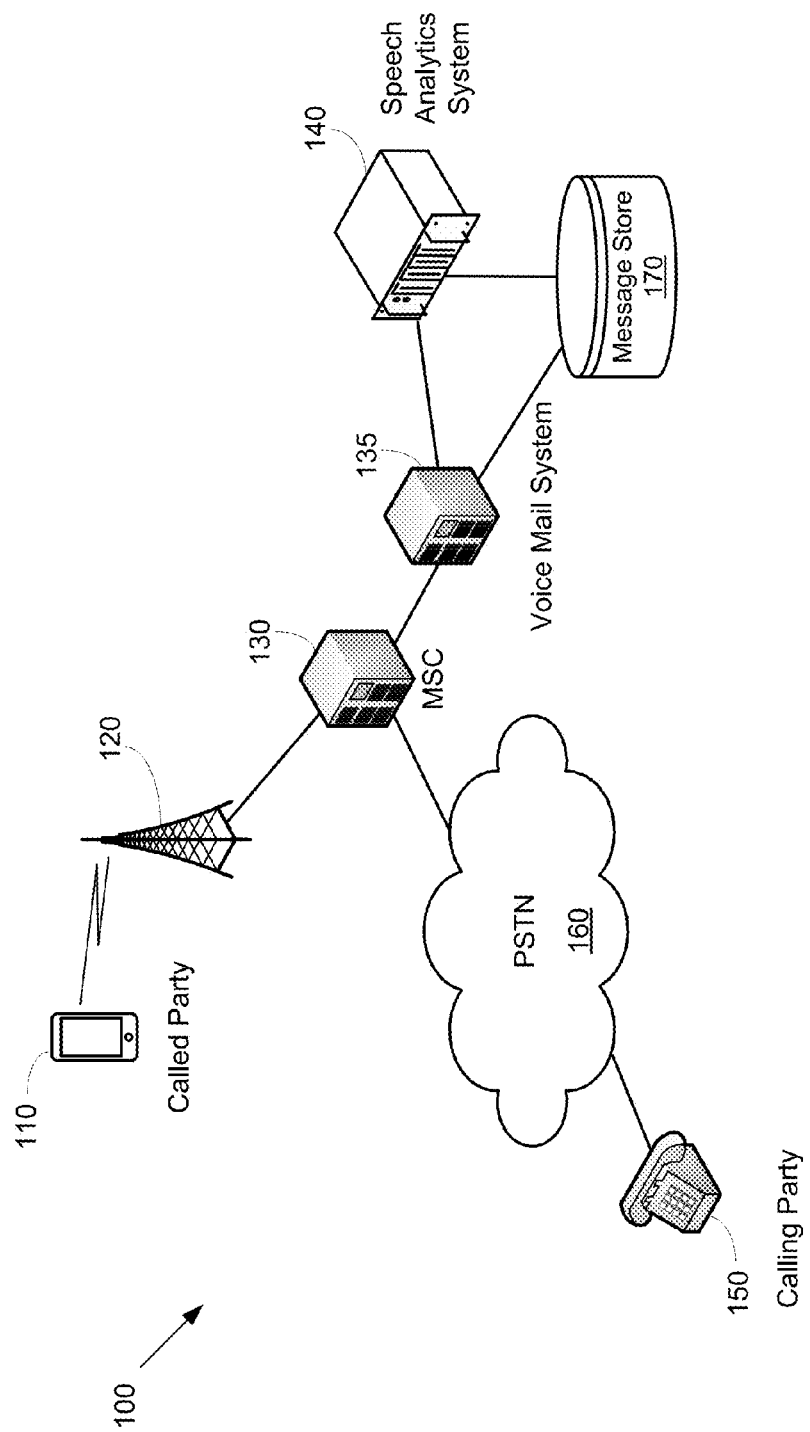
FIG. 1 illustrates an architecture of one embodiment involving a wireless carrier using a speech analytic system for processing voice messages according to various embodiments of the invention.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Many individuals are familiar with voice mail features offered by telecommunications providers. In the case of wireline telephony voice mail, a conventional telephone may be used that provides a rudimentary, but well known, user interface for reviewing and retrieving messages. Conventional phones may rely on voice prompts or stutter tones to inform the user of a pending voice mail message and provide prompts to a user. Further, voice mail systems frequently accept keypad tones (e.g., dual tone multiple frequency or DTMF tones) generated by the telephone as a means of a user to indicate commands.

In the case of wireless (cellular) services, the mobile processing device may be a smart phone, which provides greater flexibility for user review and retrieval of voice messages. In many instances, the mobile processing device provides a graphical user interface ("GUI") for indicating the existence of voice mail messages, along with information about the messages, such as the time the message was left, who the message was from, and the message duration. The capability of viewing text-based information related to pending voice message is generally viewed as a quicker and more efficient means of user interaction as compared to using a conventional telephone.

Regardless of how the voice mail service is provided, information characterizing the contents of the voice message or the sender is usually not provided. Some prior art systems will convert the voice message to text, but reviewing the message in text form is still reviewing the contents of the message, as opposed to reviewing information characterizing the contents of the voice message. Thus, the user is frequently left to rely on meta-data when reviewing pending voice mail messages. Such meta-data typically comprises information regarding the identity of the originator of the message, the date/time the message was received, and the duration of the message.

Based on the concepts and technologies disclosed herein, it is possible to further provide an indication with each voice message as to the contents of the message and/or information about the sender. Specifically, a message characteristic icon ("MCI") can be defined to convey certain message characteristics that are derived from the audio of the message. In some instances, the MCI reflects a non-semantic characteristic or aspect of the message and/or sender that can be displayed to the user. In such instances, the MCI is referred to as a non-semantic MCI ("NS-MCI"). Examples of such non-semantic characteristics include age of the speaker, gender of the speaker, speaker identity, personality of the speaker, and an emotional characterization of the message delivered by the speaker.

Providing a NS-MCI regarding the emotion associated with a message may be accomplished with or without analyzing the semantic meaning of the message. For example, an NS-MCI may indicate a message and/or sender that is "angry". This may be determined by analyzing speech energy levels (without understanding the semantics of the message), but may also incorporate a semantic analysis of the message. However, generally speaking, the NS-MCI does not indicate the information about the contents of the message.

The MCI may also reflect a semantic based analysis of the audio, resulting in displaying a semantic-MCI ("S-MCI") to a user. An S-MCI characteristic typically involves analyzing the semantic of the message, and may also include non-semantic analysis. For example, the S-MCI may characterize the message as providing information, asking a question, or containing curse words. In order to more accurately detect a question, the rise and fall of the speaker's pitch may also be analyzed. However, this may not be required in all instances.

Of course, some MCI's may be considered as falling into both categories, e.g., being partially a NS-MCI and/or an S-MCI. The distinction is not always clear-cut. For example, an MCI may indicate that a voice message comprises curse words spoken in anger. As many can appreciate, a voice message may include a curse word that can express a positive feeling, but may have a completely different meaning if the curse word is uttered in a tone of extreme anger. Thus, different MCIs could be defined to reflect the mere existence of a curse word, or a curse word stated in a context of surprise or anger. How the different MCIs are defined and correlated to the processing may impact as to whether they would be categorized as a NS-MIC or an S-MCI. However, this does not alter the application of the concepts and technologies described herein.

Thus, different types of icons, e.g., MCIs, can be defined to reflect the various forms of analysis. For instance, different MCIs can be defined to can provide a succinct warning or indication to the user of some aspect of the voice message and/or sender. Different MCIs can be defined to indicate messages which contain highly charged content or indicate messages which are from a young person. When coupled with originating party information (e.g., the originating caller), this may be useful to the user.

For example, a voice message received from an individual's boss is usually deemed important to the individual, but when reviewing the voice mail the individual may find it useful to view an icon indicating whether the voice message reflects anger or whether it reflects a question. Similarly, when a spouse is traveling on a business trip and sees a message originating from his home number, that person knows that the message is likely from a household member. However, it may be useful to know whether the message was from a young child (the user's child) or an adult (the user's spouse), or whether the originator was male or female. This may allow the recipient to distinguish messages from various household members. Different icons can be defined to reflect the different forms of speech analysis that can be performed.

These different icon types may be separately named. For example, one type of non-semantic MCI may reflect emotion, and the corresponding icon may be classified as an "emoticon." A prior art definition of an "emoticon" is a "metacommunicative pictorial representation of a facial expression intended to convey the sender's feelings or tone." A common instance of an emoticon is a "happy face" icon, and a variety of other facial expressions are possible. As used herein, the definition of an emoticon is modified so that it is a pictorial representation, which frequently may represent a facial expression that conveys a characteristic of the message or the originator, including a feeling or tone. As it will be seen, other symbols (e.g., icons other than a facial expression) can be used to reflect a feeling or tone. For certain applications, such as indicating the gender of the voice message, the icon could be a facial-oriented emoticon-like icon, with a facial expression recognized as that of a male or female. However, it may be equally effective to use other symbols which are commonly recognized as representing gender.

Recall that another category of MCIs involved semantic MCIs reflecting characteristics of the message. This would include characterizations that the message contents are generally conveying, e.g., a question or providing information. In such instances the MCI may be a punctuation mark. For example, if a voice message largely relates to a question, a "?" punctuation symbol may reflect this characterization effectively. Such a punctuation mark (which may be considered a symbol) is distinguished from an emoticon (which is a pictorial representation of a facial expression). A symbol could be a dingbat or wingbat, which are various types of ornamental or graphical images used in typesetting or computer word processing. As used herein, a symbol could reference any instance of an MCI, and could be one or more characters or punctuation marks used as a group, and includes various forms of wingbats and/or dingbats.

It is recognized that emoticons are commonly used in text-based messaging applications, where the originator includes the emoticon in the text sent. In this case, the emoticon may be an icon or, frequently a set of punctuation characters used to represent an icon. For example, text may be included such as ";-)" to represent a side-ways happy face. However, this usage is in clear distinction to the concepts disclosed herein, where specialized processing of the audio is used to derive an emoticon (or more generally, an MCI) and which is appended to meta-data in various ways. Thus, the concepts and technologies presented herein should not be confused with any symbols or graphical characters that are generated by the sender as part of the message itself.

In many instances herein, examples of the concepts will be expressed by using a particular form of an MCI, namely the emoticon to express an emotional aspect of the message, but this should not be interpreted as limiting application to only emoticons. Other MCIs can be used to convey other semantic or non-semantic aspects. Further, although the examples provided herein illustrate the concepts in the context of a voice mail service, the technology and concepts can be applied to other applications that provide voice messaging. This would include applications that provide voice messaging using other infrastructures or communication facilities. For example, some smart phones or computer programs also provide voice messaging capabilities. Such applications can be augmented to incorporate the technologies and concepts disclosed herein to process the audio of the voice messages to derive and display corresponding MCIs.

Depending on the processing performed on the speech, a displayed MCI may reflect a variety of characteristics. It is possible that analysis of the speech may provide various insights other than emotion. It is possible to semantically process the voice message and provide an indication as the general nature of the voice message (e.g., to provide information or ask a question). However, other advances in speech analysis can provide information indicating age, gender, speaker identify, or even personality of the message originator. This requires use of a speech analytics system configured to analyze the audio in a prescribed manner, so as to determine the desired characteristics.

General Architecture

FIG. 1 illustrates an embodiment of an architecture for practicing the concepts and technologies disclosed herein. In this architecture 100, a calling party using a conventional telephone 150 places a call to a wireless subscriber, denoted as the called party, using a smart phone 110. Typically, the call is initiated by the telephone 150 to the PSTN 160, although other carriers and technologies could be used. The call is then routed to a mobile switching center ("MSC") 130 used by the wireless carrier. The MSC 130 may access various location databases (not shown) to ascertain the proper cell tower 120 to broadcast a call setup message to the called party. Once this information is broadcast, the smart phone 110 is notified of the call, and the smart phone determines that a call is being offered and will ring the phone.

The called party may not be available to answer the call or may simply ignore the call. The wireless system may be configured so that if the call is unanswered after a defined number of rings or a set time period, the MSC 130 will redirect the call to a voice mail system ("VMS") 135. Redirecting the call may involve using a "call-forwarding no-answer" feature or a similar feature provided by the MSC. This feature may be adapted to forward the call to a voice mail system ("VMS"). The call is offered to the VMS 135 and includes an indication of the called party's telephone number, so that the VMS can retrieve and play the appropriate greeting to the calling party after answering the call. After the greeting is played, the calling party can then leave a voice message. When completed, the calling party can hang up.

Assuming that the calling party leaves a voice message, the voice message may be stored in a database controlled by the VMS, which is shown in FIG. 1 as a message store 170. The VMS 135 may then notify a speech analytics system ("SAS") 140 of the existence of the voice mail message, including information required for the SAS to retrieve that voice mail message from the message store.

The SAS 140 can then retrieve the message, and process it to ascertain emotional characterization, content, and/or other related information. The SAS 140 may then inform the VMS when processing of the voice file is completed along with information regarding the emotional characterization, etc. The VMS (or SAS) may augment the meta-data stored with the voice file in the message store 170 by including indicators for any applicable emoticons or other types of message characteristic indicators. In other embodiments, the SAS may update the meta-data directly or provide it to the VMS to update.

Next, the VMS 135 may then inform the MSC 130 that the voice message is stored, and, in response, the MSC 130 can then inform the smart phone 110 of the existence of the voice message. The MSC 130 may accomplish this by sending a message to the smart phone 110 indicating the existence of the voice mail message. This message may include meta-data about the voice mail message, such as the time the message was received, the originating telephone number of the calling party, message duration, and any associated MCI indicator. Thus, when the user accesses the appropriate display on the smart phone to review their messages, the appropriate MCI may be displayed to the user.

In this embodiment, the SAS processes the voice file after the voice message is stored in the message store database. In other embodiment, the SAS may process the voice message as it is received, so that the applicable emoticons are stored in real-time. Those skilled in the art can construct other variations in light of the above disclosure.

The above embodiment serves to illustrate application of the principles, and does not limit application thereof to only voice mail applications or to wireless carriers. As will be seen, the principles can be applied to other messaging applications which do not involve conventional voice mail service.

Process Flow

Figure 2:
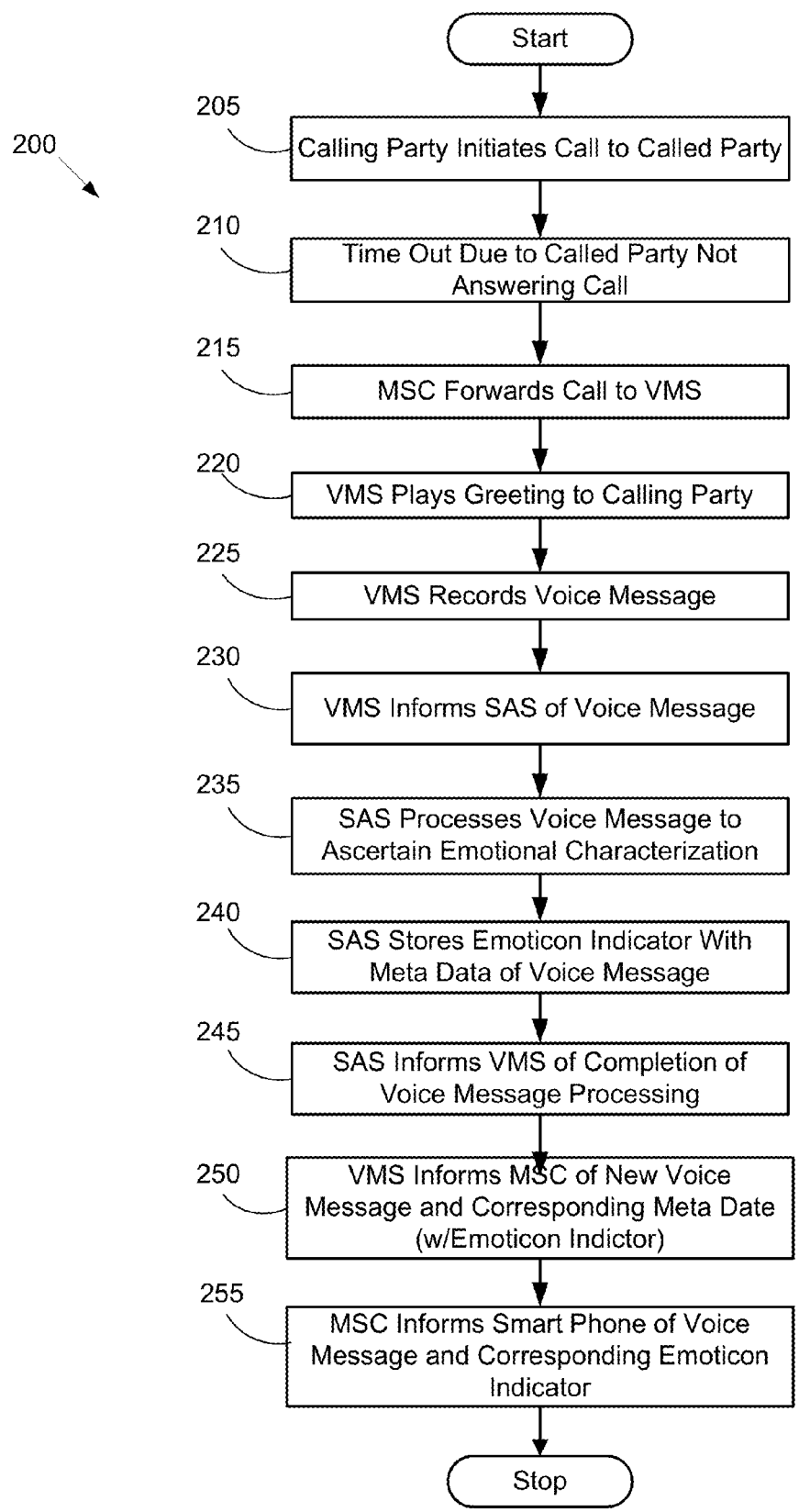
FIG. 2 illustrates an embodiment of a general process flow involving a wireless carrier for practicing the various technologies and concepts disclosed herein.

The operation of one embodiment of a service illustrating application of the concepts is reflected in the process flow of FIG. 2. The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

The process flow 200 shown in FIG. 2 begins with the calling party initiating a call to the called party (e.g., the wireless subscriber) in operation 205. The call is offered to the called party, and provided that the called party does not answer within a certain amount of time, a timer expires in operation 210. Presuming that the MSC is provisioned to provide voice mail service to the wireless subscriber, the MSC forwards the call to the VMS in operation 215. Typically, the telephone number of the called party and calling party (if known), is provided to the VMS. The VMS typically will play the greeting established by the wireless subscriber in operation 220, and record any voice message left by the calling party in operation 225.

At this point in this embodiment, the VMS may inform the SAS of the existence of a new voice mail message in operation 230. The SAS may retrieve and process the audio of the voice message to ascertain various types of information based on the speech of the calling party. As will be discussed later, there are various forms of information that can be derived based on processing the speech of the calling party, and for purposes of illustration, this may be presumed to be some form of emotional characterization of the voice message, which is completed in operation 235. For purpose of this illustration, no distinction is made between an emotional characterization of the voice message and an emotional characterization of the sender as they are providing the voice message. In other words, an "angry" message is not distinguished from a message from an "angry" caller.

The SAS may then store, update, or cause to be updated, the meta-data of the voice message in operation 240, which may be part of the voice message file itself or another file associated with the voice message. The information stored may reflect information derived from the processing of the audio, such as emotional characterization, age of the caller, gender of the caller, and other aspects. In other embodiments, the semantic content of the voice message may be analyzed, and an S-MCI reflecting the content of the voice message may be indicated. When the SAS has completed ascertaining the appropriate MCI(s), it may inform the VMS of the completion of this task in operation 245. In this embodiment, the meta-data includes an indicator, which represents the MCI to be displayed on the display device.

Next, the VMS may inform the MSC that a new voice message has been stored for the wireless subscriber in operation 250, and in response, the MSC may send a notification message to the wireless subscriber's smart phone in operation 255. This message may include various meta-data, including originator information and an MCI indicator. In other embodiments, a separate message comprising the MCI indicator could be sent to the smart phone. At this point, the user may retrieve and/or review the message at their convenience.

The exact order of details of each step may vary, particularly with respect to the interactions between the VMS and the SAS. In various embodiments, the VMS may access and interact with a separate SAS system, whereas in other embodiments, the VMS may have an integrated capability to analyze the speech. Further, in other embodiments, the MSC may interact with the SAS to inform the SAS of the speech file to process, and wait until the SAS has completed processing of the voice mail message before the MSC informs the wireless user of a new pending voice mail message. In other embodiments, the processing of the voice message occurs in real time as the message is being provided by the calling party, so that there is no delay in the VMS informing the MSC of the existence of a new voice mail message after the message has been left. No doubt those skilled in the art will be able to devise various approaches and signaling messages for accomplishing the desired processing in light of the present disclosure.

Figure 3:
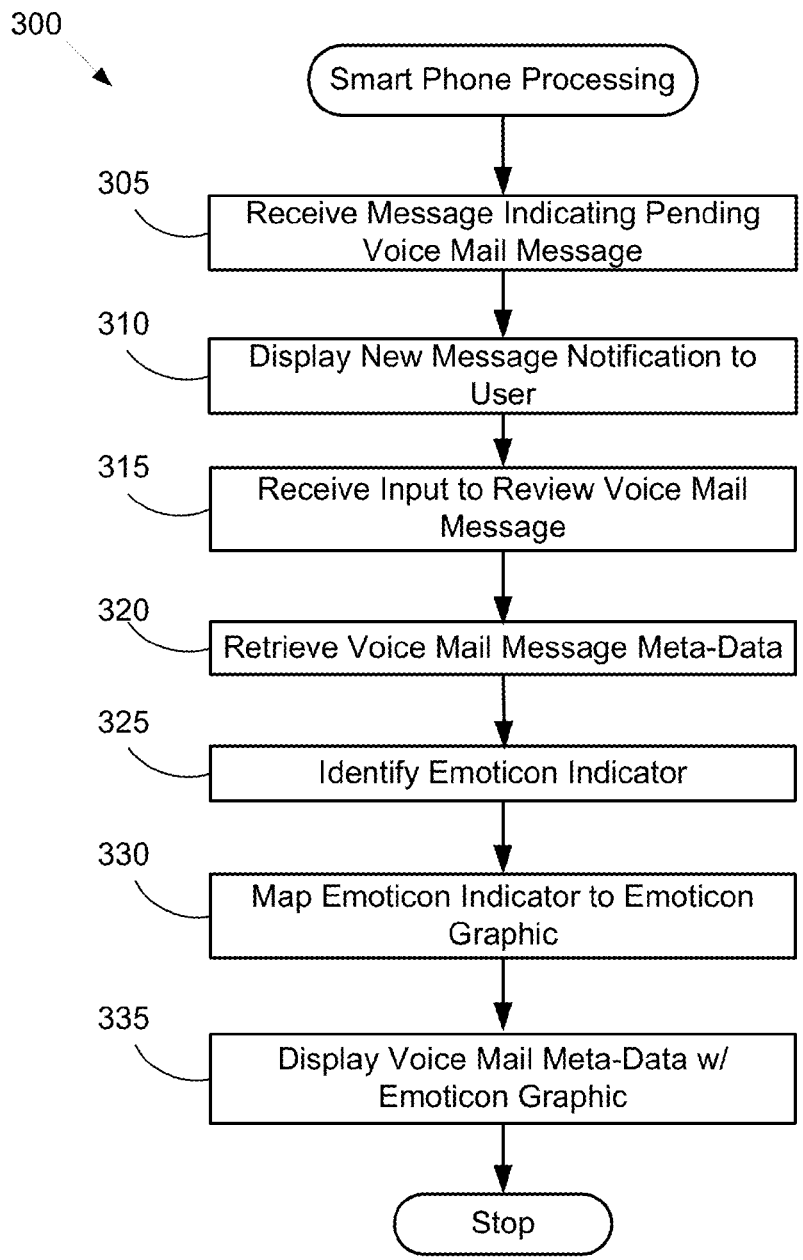
FIG. 3 illustrates a process flow that may be executed by a smart phone according to various embodiments of the invention.

The processing associated with a smart phone of the user retrieving and reviewing voice mail messages is shown in the process flow of FIG. 3. Turning to FIG. 3, the flow 300 begins with the smart phone receiving a message from the MSC indicating that a new pending voice mail message is available for review in operation 305. This notification may include meta data, such as the originating party, time of the message, duration, and a MCI indicator. The smart phone can be configured to appropriately inform the user of the existence of any new messages in operation 310. This may include the meta-data, or may simply apprise the user that unreviewed messages are pending.

At some point, the user may opt to review pending voice messages. If so, the appropriate input from the wireless subscriber to review the voice messages is received at the smart phone in operation 315. The smart phone may then retrieve the voice mail message meta-data stored in memory for all the pending messages in operation 320, which may reflect information such as the originating telephone number, duration, time of message, and an appropriate MCI. Alternatively, or in addition, this meta-data information may be displayed to the user along with the notification of new voice message. The smart phone may process the MCI indicator so as to identify the appropriate MCI to display in operation 325.

The mapping of the MCI indicator in the meta-data to the MCI display may be performed on a per-user, per smart phone, or standardized basis in operation 330. In other words, a user may define which MCI are used for different purposes, or the phone manufacturer may define this. In one embodiment, the manufacturer of the smart phone may incorporate a pre-defined library of MCIs associated with each MCI indicator. For example, an indicator of an "angry" MCI indicator may map to an emoticon displaying an angry facial icon. Similarly, a "happy" MCI indicator may map to a happy facial emoticon. In other embodiments, the user may configure the phone to define which emoticon is mapped to each MCI indicator. In some embodiments, the user may be able to define the particular MCI that is mapped to an MCI indicator. Thus, for example, the user could define a graphic image, photo, or icon of a snarling dog to replace an angry emoticon that is displayed when an angry voice message has been detected.

The smart phone may perform other processing of the meta-data, such as mapping the telephone number of the calling party with a name associated with that number in the user's contact list. Once the processing of the meta-data is done, then the appropriate voice mail meta-data information may be displayed to the user in operation 335.

At this point, the user may view the MCI displayed along with other meta-data from each voice mail message, and select the appropriate messages to review based on the MCI. In some embodiments, the smart phone may be configurable so that it may order or rank the pending voice mail messages based on the MCI instead of, for example, based on time. For example, messages associated with a "happy" or "angry" emoticon may be displayed with a higher priority compared to other messages.

Graphical User Interface

Figure 4:
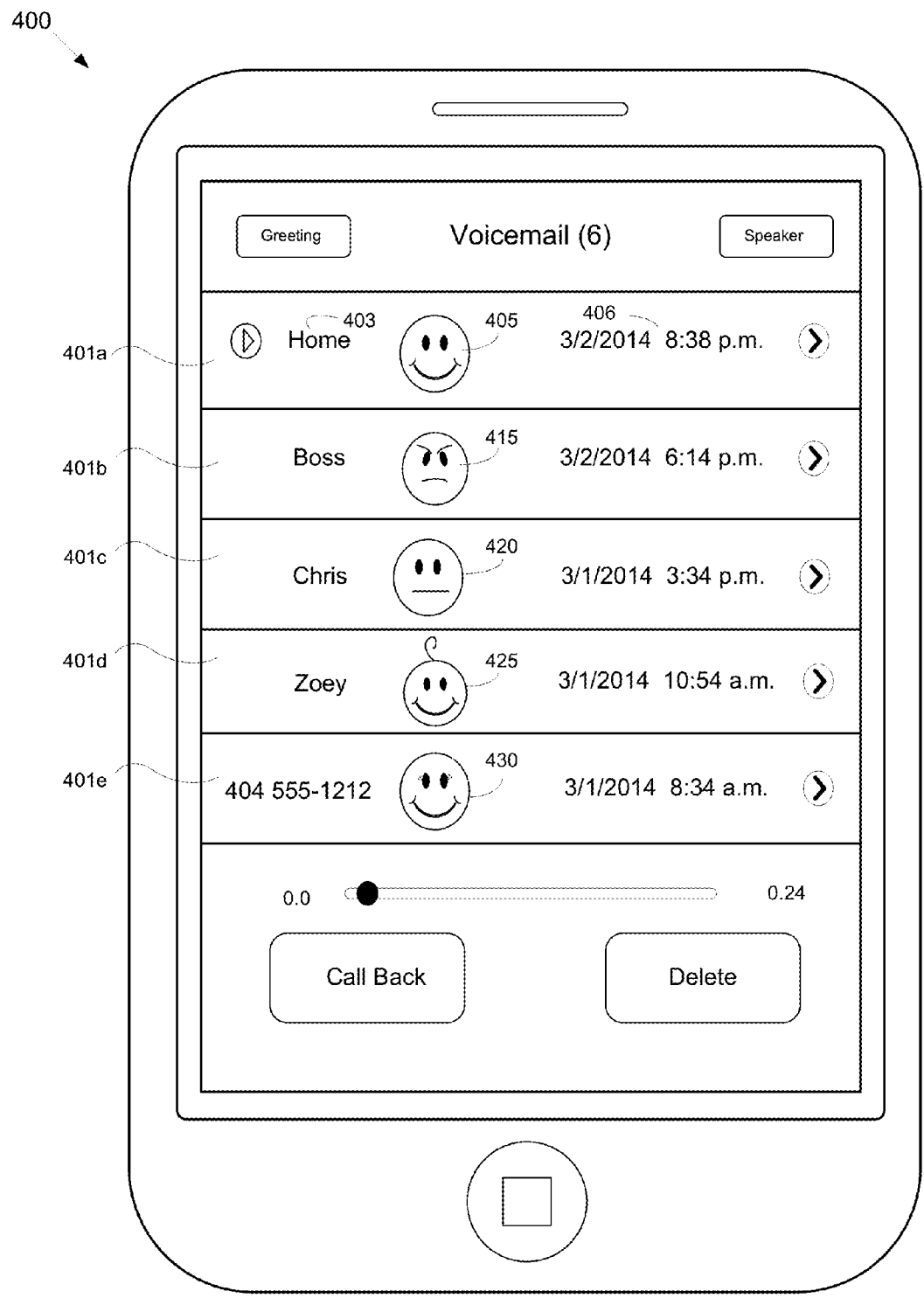
FIG. 4 illustrates one embodiment of a graphical user interface on a smart phone according to various embodiments of the invention.

An illustrative graphical user interface ("GUI") 400 displaying emoticons in conjunction with stored voice messages is shown in FIG. 4. This represents one screen format that may be presented to a user of a smart phone that is configured to display emoticons in conjunction with pending voice messages. The display of emoticons may be optional, as this may require in some embodiments that wireless service provider perform speech processing on stored voice mail messages. Thus, the smart phone can be configured to not display emoticons if there are no emoticon indicators provided by the wireless provider when reporting pending voice messages.

In this embodiment, there are five pending messages shown, each with a corresponding area 401a-401e delineating the meta-data associated with each voice message. Turning to the first indicated message 401a, an indication 403 of the name associated with the calling party is shown. This may be based on a name the user defined in a contact list for a given number stored in the smart phone. When the message notification message is provided to the phone, the telephone number of the calling party may be examined to determine if there is a corresponding name defined in the contact list. If so, that name may be used to indicate the originator of the voice message.

Next, an emoticon 405 is shown. In this embodiment, a "happy face" emoticon is presented which indicates the audio speech contains a positive or happy emotion characterization. Next, meta-data indicating the date and time 406 of the message's receipt is shown. Other forms of MCI may be shown, as FIG. 4 represents only one embodiment of the types of MCIs that may be displayed.

A set of emoticons may be defined for various characterizations of the emotional content of the audio and/or characterizations of the sender, depending on the capabilities of the speech analytics engine. For example, an "angry" emoticon 415 is shown in the second pending message 401b. This may reflect a detected angry message characteristic or frustrated emotional indication by the speech analytics system. A "neutral" emoticon 420 in the next pending voice mail message 401c may reflect that neither a positive nor a negative emotional characterization was derived from the voice mail message. A variety of emoticon formats could be defined and used to indicate different emotional characterizations of the voice message.

The emoticons may also represent information about the sender. For example, speech processing can be used to provide information about the age and/or gender of a person. Thus, processing of the speech by the SAS may identify a likely gender or age group. This may be indicated by emoticons. For example, an emoticon of a baby 425 may be used to indicate a voice message left by a young calling party. Another emoticon 430 may be used to indicate a female caller. Other emoticons may represent other age groups or male callers. A particular MCI may be used to identify a particular household member, so that a user can identify, e.g., which of several children left a message to the user, but where the originating number is the same (e.g., the user's household telephone number). This relies on a speaker identification ability of the speech analytics system.

Figure 5:
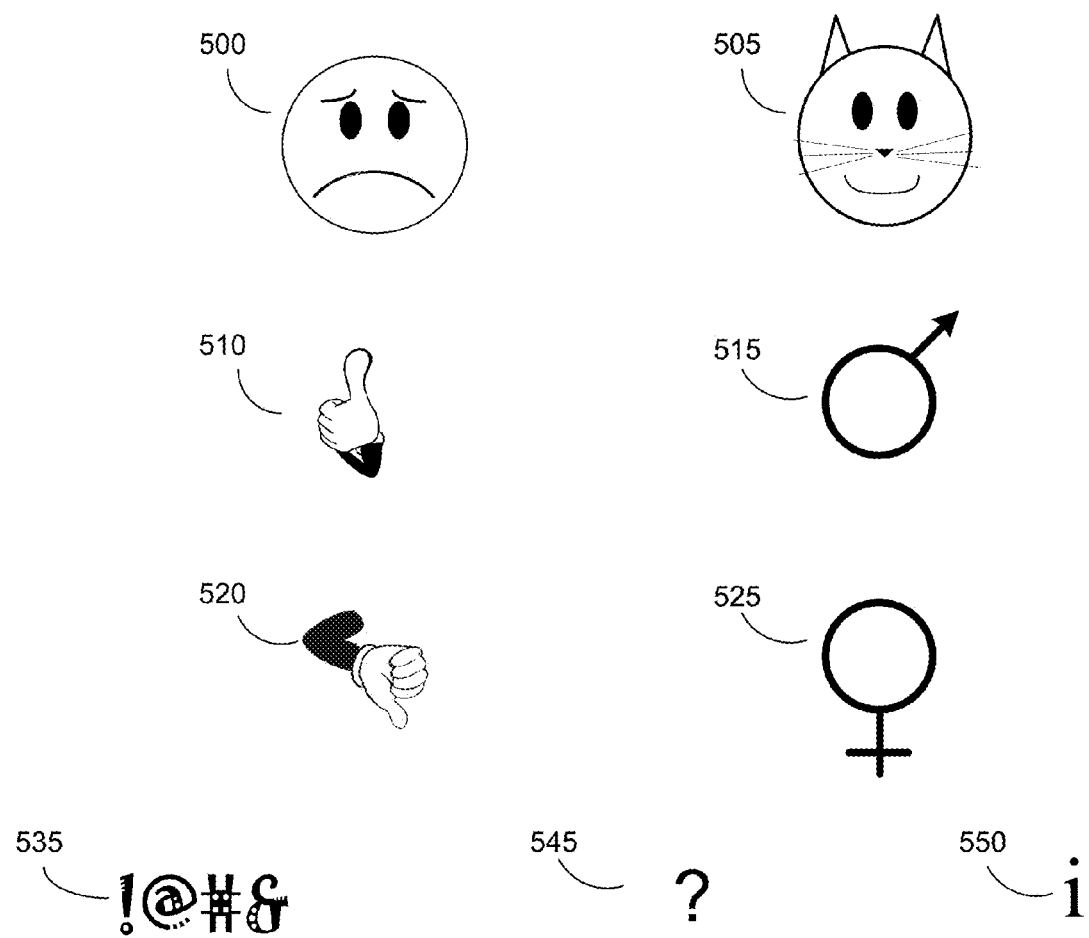
FIG. 5 illustrates various embodiments of emoticons that may be displayed on a smart phone.

FIG. 5 illustrates other possible set of MCIs, and it should be recognized that a wide variety of forms and styles could be used. An MCI 500 may represent a voice message or sender having sad speech characteristics. Other MCIs may be styled to reflect personal interests of the user, such as a cat 505 or "hello kitty" styled emoticon for users that are fond of cats. Other formats could be defined to reflect the personal interests and tastes of users. Such customization is often deemed desirable by users. MCIs representing gender of the caller can include symbols 515, 525 for male and female, respectively. Further, MCIs can be icons 510, 520 that represent a positive or negative tone, respectively, of a voice message.

The speech processing performed by the speech analytics system may further process the content of the voice message to ascertain what words were said in the voice message. Further, the information ascertained from semantic content could be combined with non-verbal characteristics to select the emoticon. Thus, for example, an angry message that comprises a large number of curse words could result in an emoticon 535 displayed that comprises symbols, which are commonly recognized as representing curse words stated in anger.

In cases where only the voice message semantic content is analyzed, the MCI indicator may reflect that the voice message contained one or more questions, as reflected by displaying a question mark 545. Alternatively, the voice message semantic content may comprise information, such that the MCI indicator results in displaying, an "i" icon 550 commonly recognized as representing information. The speech analytics system could determine the nature of the voice message by detecting certain keywords (e.g., analyzing semantics of the message). For example, if the phrase "I wanted to let you know" or "did you know" was detected, this may indicate the purpose of the voice message was to convey information and results in the "i" icon 550 being displayed. On the other hand, if the phrase "I wanted to ask you" or "do you know" is detected in the voice mail message, then the question mark MCI 545 may be more appropriate as the purpose of the phrase is primarily to ask a question.

SAS Processing Flow

The SAS may process the voice message, either in real time as the caller is leaving the message, or in non-real time, after the message has been stored. Other embodiments may process the audio in near-real time, which is somewhat in-between the above two examples. For example, as the voice message is being streamed and stored, the SAS may subsequently read the stored audio message prior to completion of the caller leaving the message, so that the analysis is completed shortly after the message is completed.

Figure 6:
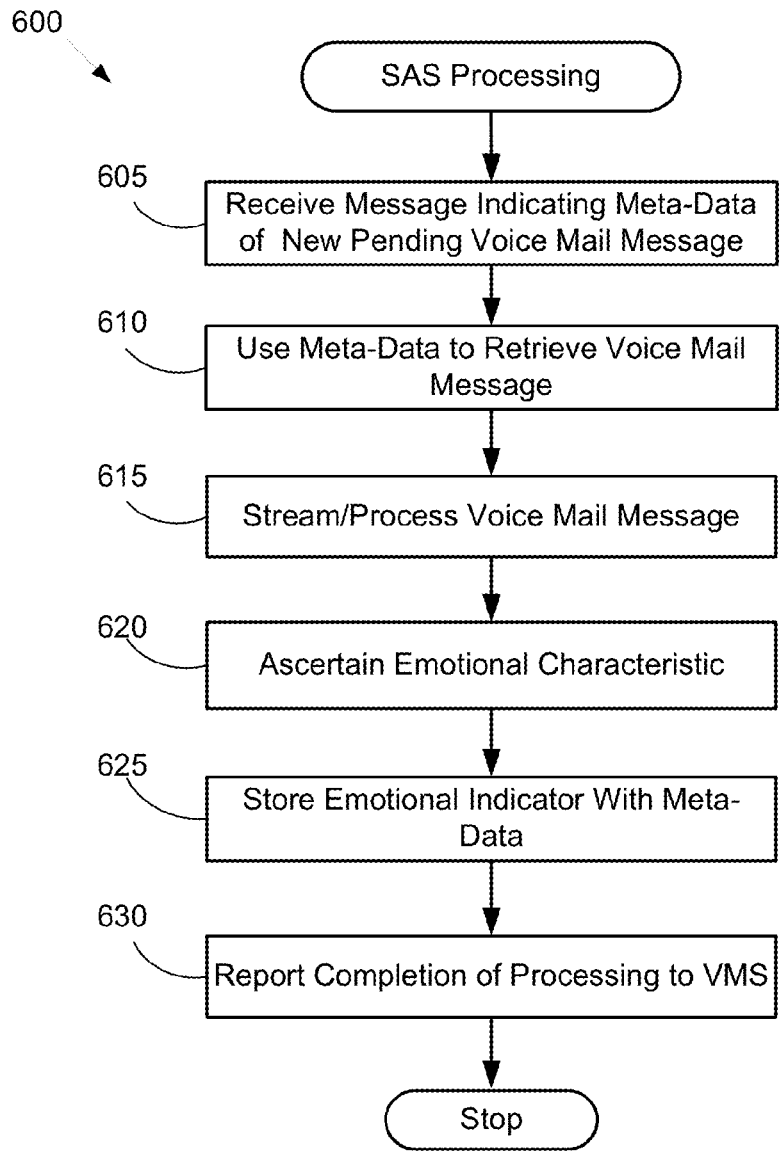
FIG. 6 illustrates one embodiment of processing that involves a speech analytics system according to the technologies and concepts disclosed herein.

One embodiment of the process flow is shown in FIG. 6. The process 600 involves the SAS receiving a message indicating a new voice message in operation 605. The indication may include meta-data, such as the called party telephone number and/or other information that allows the SAS to access the voice message. Next, in operation 610, the SAS uses the meta-data to retrieve the voice mail message.

The SAS may then process the voice mail message in operation 615. This may involve retrieving the entire file and processing it, or streaming the voice data and processing it as it is being received. Regardless of how this is performed, the SAS ascertains a message characteristic, e.g., determines which MCI indicator is applicable in operation 620. In other embodiments, a plurality of MCI indicators may be determined. This information may be stored with the meta-data in operation 625. The VMS may perform any indexing, searching, or retrieval functions based on the MCI indicator. Finally, the SAS may report completion of its processing to the VMS in operation 630, so that the VMS know that it may report the pending voice message to the MSC or other application software application.

Processing Speech to Ascertain Non-Semantic Characteristics

The algorithms used by the SAS will depend on what characteristic is sought to be determined from the voice message. The non-semantic characteristics of the speech may suggest the age, gender, or personality of the caller, as well as the emotion associated with the delivery of the message. Various techniques are known and described for determining such aspects. For example, U.S. patent publication 2013/0268273, entitled "Method of recognizing gender or age of a speaker according to speech emotion or arousal" discloses approaches for ascertaining gender or age. One approach for detecting emotion is detailed in European Patent EP1298645, entitled "Method for detecting emotions in speech, involving linguistic correlation information" or may be found in U.S. Pat. No. 7,340,393, entitled "Emotion Recognizing Method, Sensibility Creating Method, Device and Software." One approach for detecting personality attributes are disclosed in U.S. Pat. No. 8,594,285 entitled "Method and system for analyzing separated voice data of a telephonic communication between a customer and a contact center by applying a psychological behavioral model thereto." No doubt, those skilled in the art are aware of other speech processing techniques for ascertaining non-semantic message characteristics.

Note that determining these characteristic of the message and/or caller may sometimes involve processing the speech by the SAS to determine the word meaning (e.g., words spoken). For example, to ascertain a personality characteristic based on the voice message, the SAS may analyze the words spoken and apply other algorithms to ascertain the speaker's personality characteristic. In other words, a SAS that merely understands and reports the words spoken in a voice message is not the same as a SAS that analyzes the words in a voice message for the purpose of indicating a personality style or trait. Thus, determination of a non-semantic MCI does not necessarily mean that a semantic analysis of the speech does not occur.

Application to Other Architectures

The concepts and technologies disclosed herein can be used in other contexts and architectures, e.g., they are not limited to processing voice mail messages for a wireless subscriber. Any application storing and providing voice messaging may apply and benefit from the principles disclosed herein to report non-semantic characteristics in addition to (or in lieu of) semantic characteristics of the message or originator. This may include, for example, interactive voice response ("IVR") systems that interact with a caller and may collect information from the caller. This includes, e.g., so-called virtual assistant or intelligent IVRs.

Figure 7:
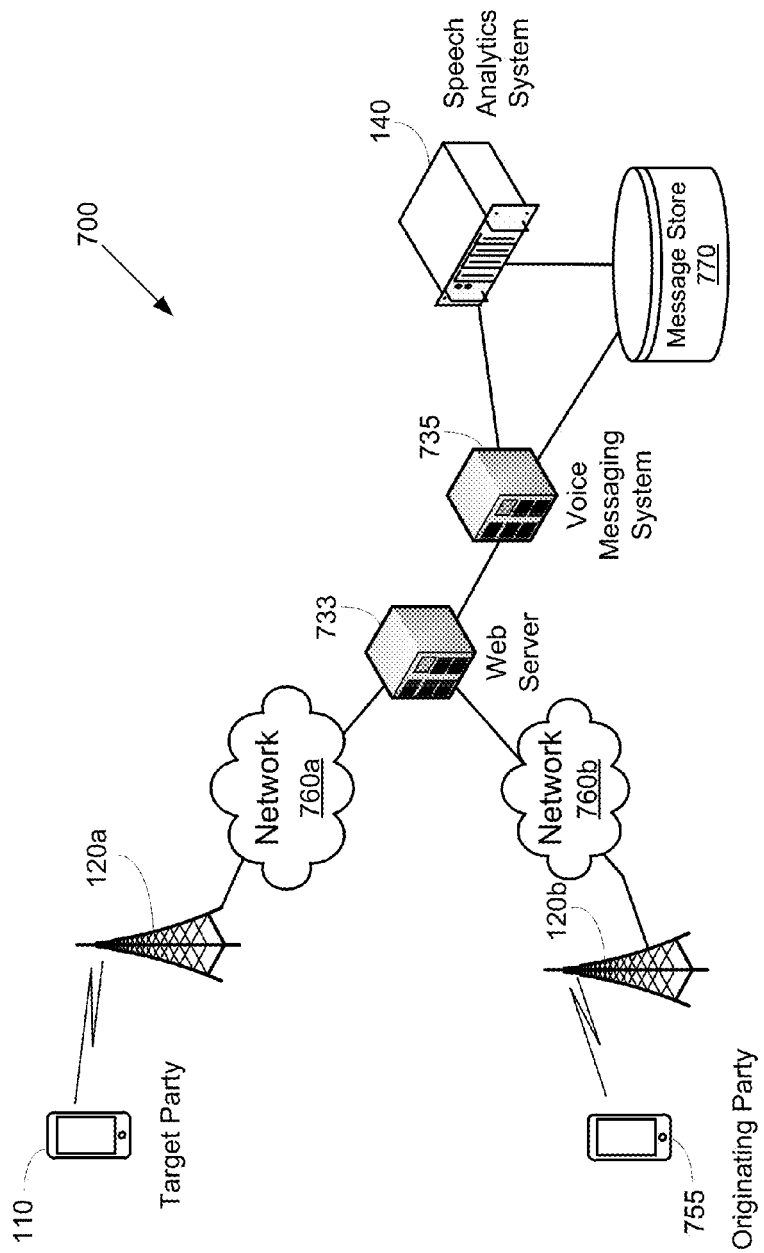
FIG. 7 illustrates an architecture of another embodiment for processing voice messages according to various embodiments of the invention.

The concepts and technologies may also be applied to mobile or desktop applications that allow voice messaging. This is illustrated in FIG. 7. In FIG. 7, the architecture 700 involves an originating party using a smart phone 755 to send a message to a target party, also using a smart phone 110. The service may be interactive, or near-real time interactive, but may not be classified as a telephone call. In this embodiment, voice messages are sent from the originating party's smart phone 755 via a serving cellular tower 120*b* via a network 760*b* to a web server 733. The web server 733 may receive the voice message and store it in a voice messaging system 735 that relies upon a message store 770. The voice message system may notify the SAS 140 of the existence of a message, and the SAS 140 may process the message to ascertain various characteristics, which are indicated to the voice message system 735. The voice messaging system 735 may inform the web server 733, which in turn notifies the target party of a pending voice message. This can be accomplished by sending an appropriate message via network 760*a*, cellular tower 120*a*, and then to the target party's smart phone 110. While this service operation is similar to voice mail, this service does not require that the users necessarily have a wireless telephony service or originate a telephone call, but relies upon the smart phones providing and accessing the voice messages and associated signaling messages via a data channel. That is, a private data messaging application loaded in the smart phone can provide a voice messaging service, without operating as a voice mail service. There are a number of proprietary messaging applications that could be extended to convey voice messages along with MCI, in addition to other forms of messaging. For example, some applications involve speech-to-text processing, which could benefit to the concepts and technologies disclosed herein.

Selection of Image for Voice Message Originator

When a smart phone receives a voice mail message, it may use the calling party telephone number and the user's contact list to determine the name of the originator. Thus, instead of displaying a voice message from a phone number, the name corresponding to that phone number as listed in the contact list is displayed. In some instances, the user may have selected a picture or image that is associated with that telephone number, so that the phone will present that image when a voice message is received from that person.

The concepts and technologies disclosed herein can be adapted to this application. If a voice message is received that has been processed and reflects a happy emotion, then a first image of that person could be selected and presented to the user, where the image depicts the person smiling. A second image could be defined, such as a photo of the person frowning, which is selected for presentation if the analysis of the speech reflects an angry tone. In other words, the selection of which image to present to the user as the originator of a voice message may be determined in part by the MCI indicator. Specifically, the originating address or telephone number along with the MCI indicator could be used to select the image to present.

MCI Determination for Speech-to-Text for Messaging Applications

It is possible to incorporate the concepts and technologies disclosed above into a single processing device, such as a smart phone. The smart phone may process speech associated with voice messages in a variety of applications. For example, a smart phone may incorporate a speech-to-text application allowing the user to send a text or a short message service ("SMS") message by speaking the contents. In operation, the user may direct the smart phone to send a SMS message, and speak the contents of the message. The smart phone uses a speech-to-text application that processes the speech to create the text of the SMS message.

The speech recognition processing can incorporate capabilities to ascertain a MCI applicable to the voice message. Thus, the smart phone can utilize the speech recognition capabilities to convert the received speech into text, and then append a MCI or MCI indicator at the end of the text message. The user may elect to accept, edit, or remove the MCI prior to sending the text message. Although the MCI is appended to text, the MCI is not typed in by the sender of the text, but by the originating smart phone processing the speech. To the receiver of the text message, it may not be readily discernible as to whether the user or the originating smart phone inserted the MCI into the text message. Although the MCI is sent along with the text, this is distinguishable from conventional approaches where the user selects and inserts an emoticon.

This feature relieves the sender of the text from selecting and indicating an emoticon at the end of the text message, and allows the faster inclusion of icons in text messages. A similar mode of operation can occur for mobile applications that allow a sender to speak the contents of an email message, which the smart phone converts to text that is included in the email. In this case, the MCI could be appended to the end of the email message contents or in the subject line of the email. Again, the user could review, edit, delete, or replace the MCI as desired.

In another embodiment, the speech recognition processing may replace one or more words with an MCI. This may be used when converting speech-to-text and the speech recognition algorithm detects a curse word. Rather than converting the speech directly to text, the algorithm may, instead, replace the representation of that word in the text string with a series of symbols. Thus, upon encountering a common expletive, the algorithm could use instead use a set of symbols, such as "!#$@" or "s**t." This would allow the reader to deduce or imagine what was intended, without the speech-to-text algorithm uttering the actual curse word spoken.

Exemplary Computer Processing Device

Figure 8:
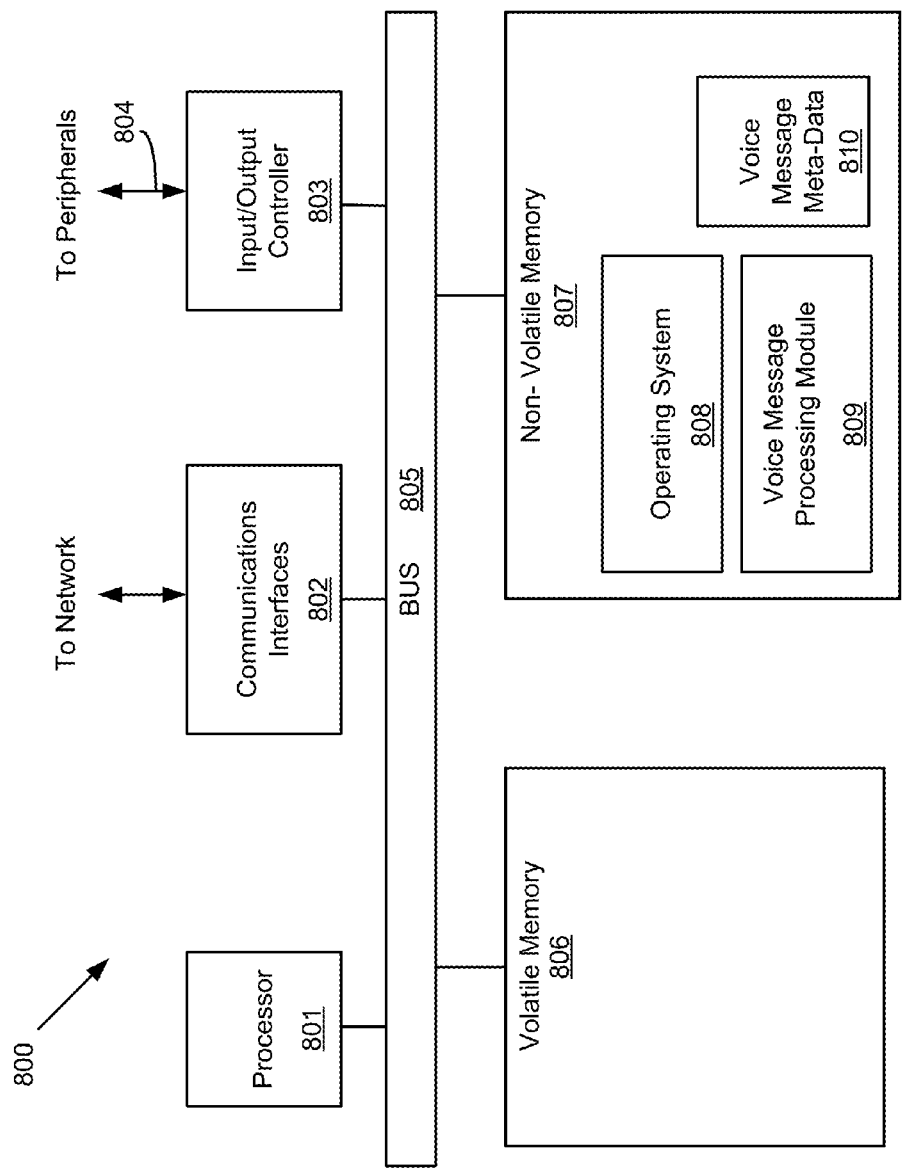
FIG. 8 illustrates one embodiment of a processing system for implementing the various concepts and technologies disclosed herein.

FIG. 8 is an exemplary schematic diagram of a computer processing system 800 that may be used in embodiments to practice the technologies disclosed herein, including the SAS, the smart phone, the VMS, web server, etc. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein. The system 800 may represent the processing system apply to one or more components executing any of the above-mentioned modules, including, but not limited to, the SAS 140 or smart phone 110.

As shown in FIG. 8, the processing system 800 may include one or more processors 601 that may communicate with other elements within the processing system 800 via a bus 805. The processor 801 may be implemented as one or more complex programmable logic devices ("CPLD"), microprocessor, integrated circuit ("IC") based microprocessor, a von-Neumann architecture-based digital computer, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In particular embodiments, the processing system 800 may include one or more communications interfaces 802 for communicating data via a data network, such as a local network, with various external devices. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

An input/output controller 803 may also communicate with one or more input devices or peripherals using an interface 804 such as, but not limited to: a keyboard, a mouse, a touch screen/display input, microphone, pointing device, etc. The input/output controller 803 may also communicate with output devices or peripherals, such as displays, printers, speakers, headsets, banner displays, etc. These may be used, in part, to receive administrator input, such as for configuring the system's operation.

The processor 801 may be configured to execute instructions stored in volatile memory 806, non-volatile memory 807, or other forms of computer-readable storage media accessible to the processor 801. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 807 may store various program code modules and data, which also may be loaded into the volatile memory 806 at execution time (though not shown as such in FIG. 8). For example, the non-volatile memory 807 may store one or more modules such as the voice message processing module 809 that implements and performs the above-mentioned process flows containing instructions for performing the processes and/or functions associated with the technologies disclosed herein, as well as operating system code 808. These modules may also manage data, such as voice message meta-data 810 for example that is used indicating the appropriate MCI to display in conjunction with the voice message. The data and/or modules in the non-volatile memory 807 may be copied in the volatile memory 806 at run time. The volatile memory 806 and/or non-volatile memory 807 may be used to store other information including, but not limited to: records, applications, programs, scripts, source code, object code, byte code, compiled code, interpreted code, machine code, executable instructions, or the like. These may be executed or processed by, for example, the processor 801 and may form a part of, or may interact with, the modules.

The technologies described herein may be implemented in various ways, including as computer program products comprising memory storing instructions causing a processor to perform the operations associated with the above technologies. The computer program product may comprise a non-transitory, tangible computer readable storage medium storing applications, programs, program modules, scripts, source code, program code, object code, byte code, compiled code, interpreted code, machine code, executable instructions, and/ or the like (also referred to herein as executable instructions, instructions for execution, program code, and/or similar terms). The computer readable storage media includes all the above tangible identified computer readable media (including volatile and non-volatile media), but does not encompass a transitory, propagating signal, photon-based storage media, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-Ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation. Furthermore, the examples for illustrating the concepts and the technologies herein have focused on agents in a contact center, but could be easily applied to other types of applications.

The invention claimed is:

1. A smart phone for providing a message characteristic icon ("MCI") indicator, the smart phone comprising:
an interface comprising a microphone of the smart phone configured to receive a voice message for a destination party comprising digitized voice data; and
a processor configured to:
store the digitized voice data in memory,
process the digitized voice data to generate a text message,
process the digitized voice data to ascertain a speech-related characteristic,
ascertain the MCI indicator reflecting the speech-related characteristic based on processing the digitized voice data,
store the MCI indicator in the memory, and
transmit the MCI indicator to a remote processing device in the text message, wherein the MCI indicator is used by the remote processing device to select a MCI to display to a user of the remote processing device.

2. The smart phone of claim 1, wherein the processor is configured to store the MCI indicator in the memory in association with a destination address of the destination party.

3. The smart phone of claim 1, wherein the processor is configured to process the voice message to generate text corresponding to the voice message, and transmit the text and the MCI indicator to the remote processing device.

4. The smart phone of claim 1, wherein the text message comprises the MCI indicator and the MCI indicator correlates to a plurality of punctuation symbols.

5. A method for indicating a speech-related message characteristic of a voice message, comprising:
- receiving the voice message at a smart phone, the voice message comprising digitized voice from a user of the smart phone;
- processing the voice message by the smart phone to generate a text message to be transmitted to a destination party;
- processing the voice message by the smart phone to ascertain the speech-related message characteristic of the voice message; and
- transmitting the text message and a message characteristic icon ("MCI") indicator by the smart phone to a destination address associated with the destination party, wherein the MCI indicator reflects the speech-related message characteristic, wherein the MCI indicator is used by a remote processing device to select a MCI to display to a remote user of the remote processing device.

6. The method of claim 5, wherein the MCI indicator is associated with an emoticon representing a facial expression.

7. The method of claim 5, further comprising:
- presenting the MCI corresponding to the MCI indicator to the user prior to transmitting the text message; and
- receiving input from the user selecting another MCI indicator to replace the MCI indicator prior to transmitting the text message.

8. A non-transitory computer readable medium storing instructions that when executed by a processor in a mobile processing device cause the processor to:
- receive a voice message generated by a user of the mobile processing device directed to a destination party;
- process the voice message to convert the voice message to a text message;
- process the voice message to ascertain a speech-related message characteristic of the voice message; and
  - transmit the text message and a message characteristic icon ("MCI") indicator representing the speech-related message characteristic to a destination address associated with the destination party, wherein the MCI indicator is used by a remote processing device to select a MCI to display to a remote user of the remote processing device.

9. The non-transitory computer readable medium of claim 8, wherein the processor is further configured to:
- transmit the text message as a short message service message to a wireless service provider.

10. The non-transitory computer readable medium of claim 8, wherein the text message comprises the MCI indicator and the MCI indicator correlates to a plurality of punctuation symbols.

11. The non-transitory computer readable medium of claim 8, wherein the processor is further configured to:
- present a MCI corresponding to the MCI indicator to the user prior to transmitting the text message; and
- receive input from the user selecting another MCI indicator to replace the MCI indicator prior to transmitting the text message.

* * * * *